United States Patent
Länsiö et al.

(10) Patent No.: US 6,842,771 B2
(45) Date of Patent: Jan. 11, 2005

(54) ADAPTER FOR RENDERING DATA TRANSMISSION REQUEST AND RESPONSES COMPATIBLE BETWEEN THE REQUESTING CLIENT AND ITS TARGET SERVER IN A WIRELESS COMMUNICATION ENVIRONMENT

(75) Inventors: Jari Länsiö, Tampere (FI); Lauri Piikivi, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 741 days.

(21) Appl. No.: 09/898,169

(22) Filed: Jul. 3, 2001

(65) Prior Publication Data

US 2002/0004818 A1 Jan. 10, 2002

(30) Foreign Application Priority Data

Jul. 6, 2000 (FI) .............................................. 20001617

(51) Int. Cl.$^7$ .............................................. G06F 15/16
(52) U.S. Cl. ..................... 709/203; 709/217; 719/315; 719/316
(58) Field of Search ................................ 709/203, 217, 709/223; 719/315, 316, 330; 707/103 R; 717/108

(56) References Cited

U.S. PATENT DOCUMENTS

| 5,754,774 | A | | 5/1998 | Bittinger et al. | ........ | 395/200.33 |
|---|---|---|---|---|---|---|
| 6,032,199 | A | * | 2/2000 | Lim et al. | .................... | 719/316 |
| 6,134,559 | A | * | 10/2000 | Brumme et al. | ........ | 707/103 R |
| H001964 | H | * | 6/2001 | Hoffpauir et al. | ........... | 370/419 |
| 6,282,581 | B1 | | 8/2001 | Moore et al. | ................ | 709/316 |
| 6,330,598 | B1 | * | 12/2001 | Beckwith et al. | ........... | 709/223 |
| 6,425,017 | B1 | * | 7/2002 | Dievendorff et al. | ....... | 719/315 |
| 6,510,550 | B1 | * | 1/2003 | Hightower et al. | ......... | 717/108 |
| 2001/0034771 | A1 | * | 10/2001 | Hutsch et al. | .............. | 709/217 |
| 2004/0111730 | A1 | * | 6/2004 | Apte | ........................... | 719/330 |

FOREIGN PATENT DOCUMENTS

| EP | 0767428 A1 | 4/1997 |
|---|---|---|
| EP | 0822492 A2 | 2/1998 |
| FI | 104873 | 4/2000 |

OTHER PUBLICATIONS

"The Common Object Request Broker: Architecture and Specification", Revision 2.0, Chapter 2: Corba Overview, 1995, 26 page document.

"Supporting CORBA Applications in a Mobile Environment", Haahr et al., MobiCom '99, 5$^{th}$ International Conference on Mobile Computing and Networking, 1999, pp. 36–47.

"Using WAP as the Enabling Technology for CORBA in Mobile and Wireless Environments", Ruggaber et al., IEEE 7$^{th}$ Workshop on Future Trends of Distributed Computing Systems, 1999, pp. 69–74.

* cited by examiner

Primary Examiner—Wen-Tai Lin
(74) Attorney, Agent, or Firm—Perman & Green, LLP (57) ABSTRACT

The invention relates to implementing data transmission between at least two sets of software used in one or more devices which comprise means for establishing a connection to a telecommunications system. The communication is partly carried out with method calls including a service request. A service broker supplies the service request included in the method call to indicated server, which responds to the method call by sending required information back to the sender of the method call via the service broker. At least some of the programs participating in data transmission are implemented with a script-based programming language in the devices. The arrangement comprises an application which transmits service requests and responses to the requests between the service broker and the software that needs data transmission, and renders data transmission requests and responses to the requests compatible between script-based software and another system.

8 Claims, 6 Drawing Sheets

ADAPTER FOR RENDERING DATA TRANSMISSION REQUEST AND RESPONSES COMPATIBLE BETWEEN THE REQUESTING CLIENT AND ITS TARGET SERVER IN A WIRELESS COMMUNICATION ENVIRONMENT

FIELD OF THE INVENTION

The invention relates to a data transmission method and arrangement in which data are transmitted between a wireless system and another system. The invention particularly relates to systems in which data are transmitted between sets of software in different devices.

BACKGROUND OF THE INVENTION

In the design and maintenance of telecommunications systems attention has been paid to establishment of connections between different systems and to smooth operation. Separate systems have often been implemented using quite a few different methods and various apparatuses which are incompatible. It has been difficult and time consuming to make different systems compatible, if at all possible.

For this reason several producers of devices and systems have developed a common architecture called CORBA (Common Object Request Broker Architecture), which allows computer systems of different types implemented with different programming languages to communicate with one another without difficulty. CORBA defines a GIOP protocol (General Inter-ORB protocol) which enables communication between devices of different types and programs programmed with different languages. The GIOP protocol is a common protocol of which a version called IIOP (Internet Inter-ORB Protocol) has been developed particularly for the Internet environment. Further information on CORBA can be obtained e.g. from the specification published by the OMG (Object Management Group) which created this architecture: The Common Object Request Broker: Architecture and Specification, Revision 2.0, Chapter 2: CORBA Overview. The specification is also available at the address www.omg.org.

CORBA has been developed for systems which have a fixed connection to one another via an unspecified network. When the protocol was designed, hardly any attention was paid to the possible capacity of the transmission path, but the emphasis was on the creation of a flexible and secure protocol. Since the proportion of wireless communication has increased strongly during the past few years, data systems and different software are also increasingly used in computers and devices from which the only or the main connection to other networks is a wireless network, such as the GSM, GPRS or UMTS. The data transmission capacity of wireless networks is, however, considerably smaller than that of fixed wired networks. For this reason CORBA has not been commonly applied to wireless systems. Transmission of CORBA over a wireless transmission path has proven to be very slow due to the large amount of signalling and data to be transmitted.

Figure 1:
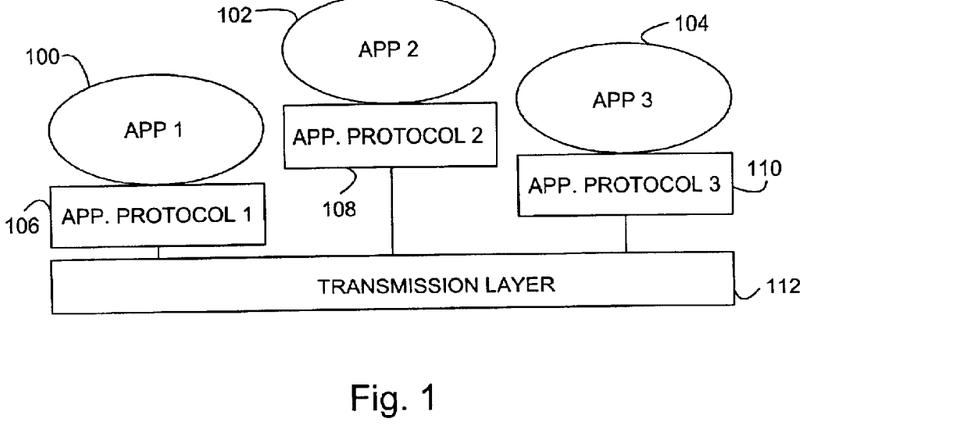
FIG. 1 illustrates prior art application protocols described above.

In wireless devices software applications have usually defined their own interfaces and connection protocol which have been directly involved in the actual data transmission. This is illustrated in FIG. 1. The figure shows three software applications 100 to 104 which run in a device employing a wireless connection. Each software application has a connection protocol 106 to 110 of its own which it uses to communicate with a transmission layer 112, which transmits data using a wireless connection. In this solution the applications need to communicate with the transmission layer, which makes development of the application difficult.

BRIEF DESCRIPTION OF THE INVENTION

An object of the invention is to provide a method and an arrangement implementing the method to alleviate the above-mentioned problems. This is achieved with a method of implementing data transmission between at least two sets of software used in one or more devices which are able to establish a connection to a telecommunications system, the method comprising implementing at least a portion of a connection between two different devices with a wireless connection and carrying out at least part of the communication between the sets of software by method calls, each of which includes a service request, the method call being supplied to a service broker of the system, which supplies the service request included in the method call to the server indicated, which responds to the method call according to the service requested by sending the information required by the service to the service broker, which sends the information to the sender of the method call, and the method comprising defining the server that offers the service request during the communication, and at least some of the programs used in the devices and participating in data transmission being implemented with a script-based programming language.

In the method according to the invention the program used in a device employing wireless connections sends method calls to a certain application, which transmits service requests and responses to the requests between the service broker and the software that needs data transmission and renders the data transmission requests and responses to the requests compatible between script-based software and another system.

The invention also relates to an arrangement for implementing data transmission between at least two sets of software used in one or more devices which comprise means for establishing a connection to a data transmission system, where at least a portion of a connection between two different devices is implemented with a wireless connection and at least part of the communication between the devices is carried out by method calls, each of which includes a service request, the system comprising one or more service brokers which supply the service request included in the method call to the server indicated, which is arranged to respond to the method call according to the service needed by sending the information requested by the service to the service broker, which is arranged to send the information to the sender of the method call, the server that offers the service request being defined during the communication and at least some of the programs used in the devices and participating in data transmission being implemented with a script-based programming language.

The arrangement of the invention comprises an application which transmits service requests and responses to the requests between the service broker and the software requiring data transmission and renders the data transmission requests and responses to the requests compatible between script-based software and another system.

The dependent claims disclose the preferred embodiments of the invention.

The invention is based on implementing software in wireless devices which adapt the requests needed by the services used by the sets of software in the wireless devices and responses to the requests between a wireless device and another external system so that various sets of software can use the same protocol and the same messages. The wireless device comprises an application of its own which converts the request generated by the software in the wireless device into a format compatible with another system, and in the other direction a response received from the system is converted into a format understood by the software in the wireless device. The application may convert a protocol used in a fixed network, e.g. a GIOP protocol, into a format that can be transmitted better on a wireless transmission path.

The method and arrangement of the invention provide several advantages. Since the invention enables use of the same protocol in several software applications in wireless devices, the protocol not being dependent on the transmission layer and having a basic structure similar to that in a fixed network, the development of software and implementation of communication will become considerably simpler, without causing too much load on the transmission path or without rendering the connection impractically slow.

BRIEF DESCRIPTION OF THE DRAWINGS

The invention will be described in greater detail by means of preferred embodiments with reference to the accompanying drawings, in which.

DETAILED DESCRIPTION OF THE INVENTION

The present invention can be applied in various radio systems where the terminals have different radio path properties. It does not matter which multiple access method the system employs. For example, the CDMA, WCDMA and TDMA can be used as the multiple access method. Furthermore, the system can support both circuit-switched and packet-switched connections.

The structure of a mobile communications system according to an embodiment of the invention used as an example will be described with reference to FIG. 2. This is only one possible alternative, which is obvious to a person skilled in the art. The main parts of the mobile communications system are a core network CN, an overground radio access network BSS and a subscriber terminal MS. The interface between the CN and the BSS is called a Gb interface in this example, and the air interface between the BSS and the MS a UM interface.

The radio access network consists of radio network subsystems RNS. Each radio network subsystem RNS consists of a radio network controller RNC and a base station B comprising one or more transceivers. The interface between the radio network controller and the base station is called a Iub interface. The coverage area of the base station, i.e. a cell, is denoted by C in FIG. 1.

Figure 2:
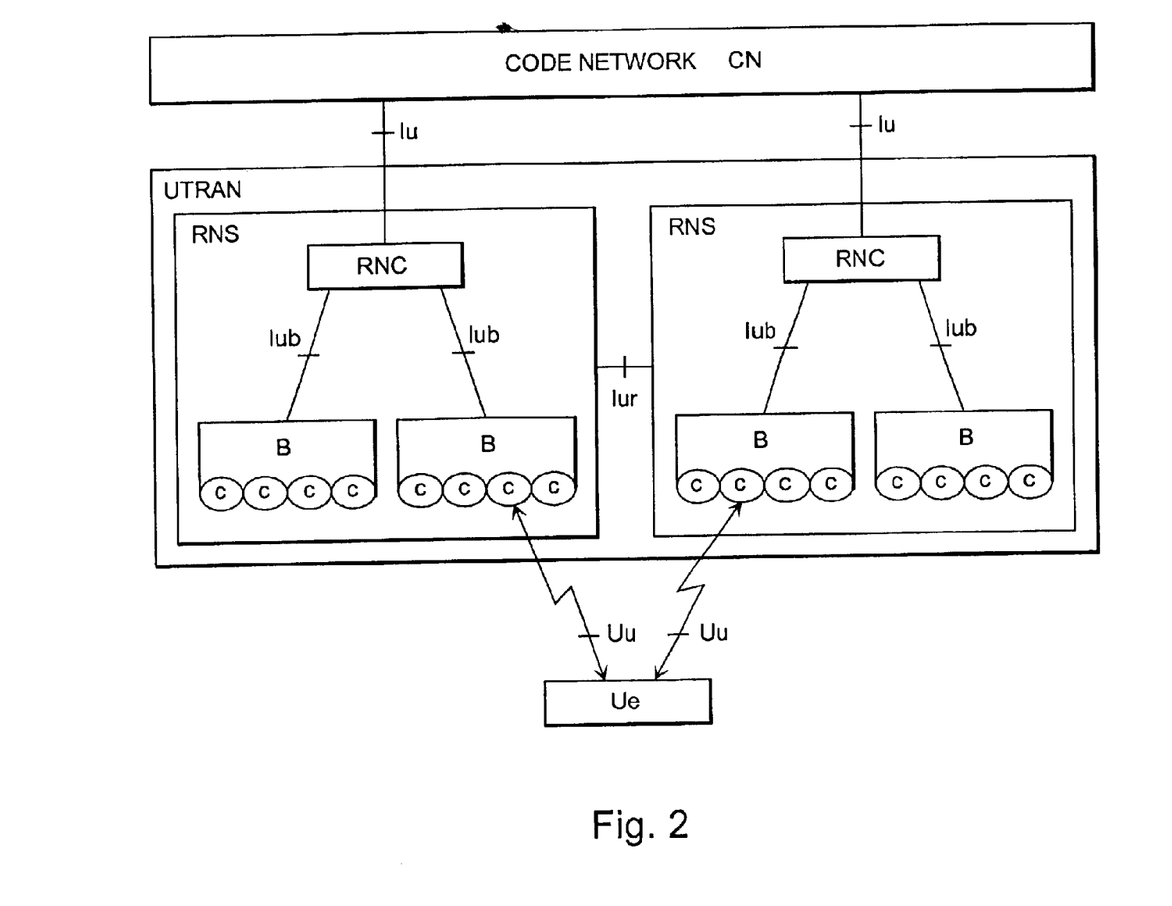
FIG. 2 illustrates the structure of a mobile communications system used as an example.
Figure 3:
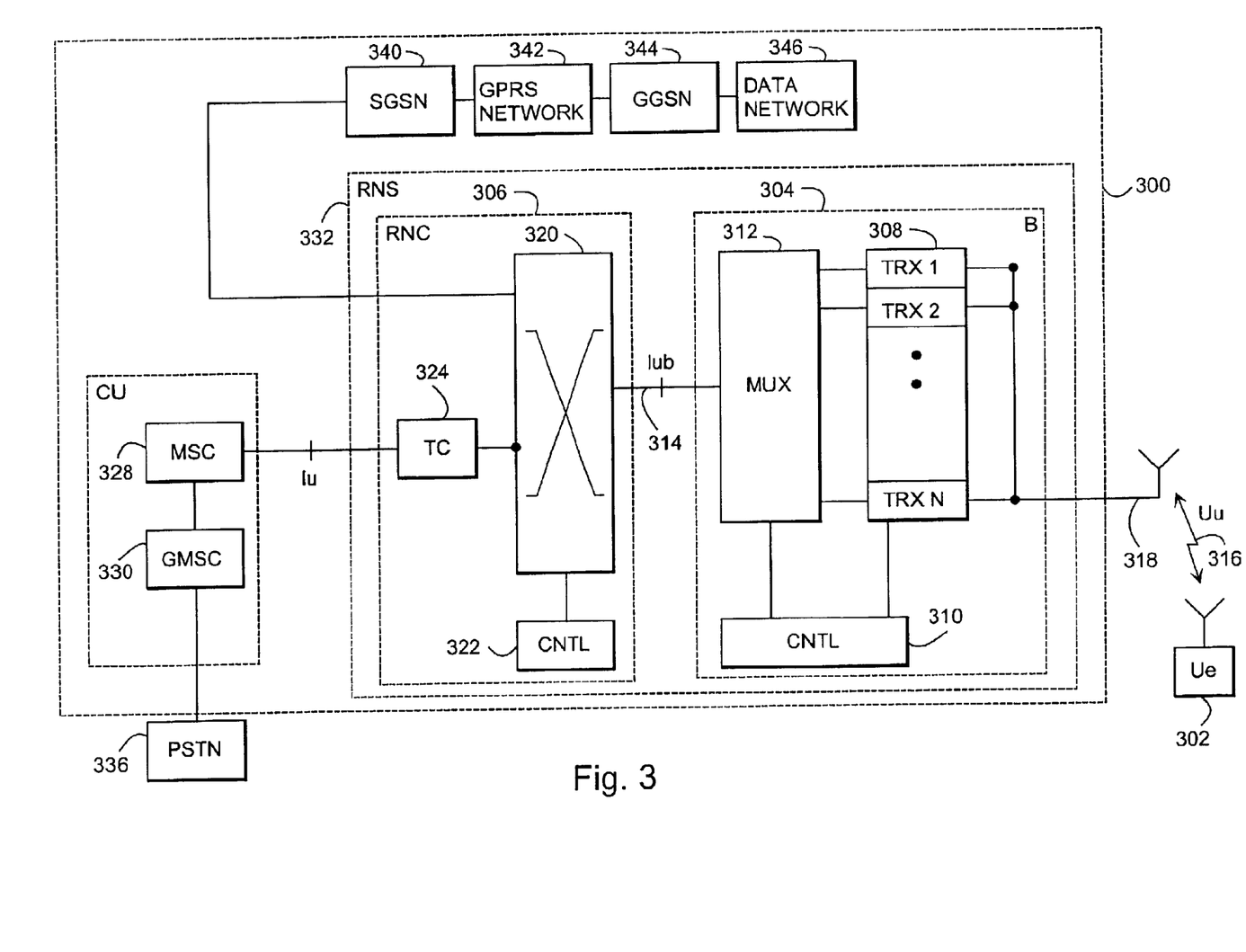
FIG. 3 illustrates the structure of the mobile communications system used as an example in greater detail.

The illustration in FIG. 2 is rather abstract, and thus it will be clarified in FIG. 3 with a more detailed example of a cellular radio system. FIG. 3 includes only the most essential blocks, but it is obvious to a person skilled in that art that a conventional cellular radio network also comprises other functions and structures that need not be discussed more closely in this context. It should also be noted that FIG. 3 exemplifies only one possible structure. In systems according to the invention the details may differ from those shown in FIG. 3 but these differences are irrelevant to the invention.

The cellular radio network typically comprises the infrastructure of a fixed network, i.e. a network part 300 and subscriber terminals 302 which can be fixed, placed in a vehicle or portable. The network part 300 comprises base stations 304. The base station corresponds to node B in the preceding figure. Several base stations 304 are controlled centrally by a radio network controller 306 which communicates with the base stations. A base station 304 comprises transceivers 308 and a multiplexer unit 312.

The base station 304 also comprises a control unit 310 which controls the function of the transceivers 308 and the multiplexer 312. The multiplexer 312 is used for arranging the traffic and control channels used by several transceivers 308 on one transmission connection 314. The transmission connection 314 constitutes the Iub interface.

There is a connection from the transceivers 308 of the base station 304 to an antenna unit 318 which establishes a bi-directional radio connection 316 to the subscriber terminal 302. The structure of the frames to be transmitted on the bi-directional radio connection 316 is system-specific and called an air interface Um.

The radio network controller 306 comprises a group switching field 320 and a control unit 322. The group switching field 320 is used for switching speech and data and for connecting signalling circuits. The radio network subsystem 332 formed by the base station 304 and the radio network controller 306 also includes a transcoder 324. The transcoder 324 is usually located as close to a mobile services switching centre 328 as possible because this saves transmission capacity when speech is transmitted in the format of a cellular radio network between the transcoder 324 and the radio network controller 306.

The transcoder 324 converts the different digital speech encoding formats used between the public switched telephone network and the radio telephone network into a compatible format, e.g. from the format of the fixed network into a format of the cellular radio network, and vice versa. The control unit 322 is responsible for call controlling, mobility management, collection of statistics and signalling.

FIG. 3 further illustrates a mobile services switching centre 328 and a gateway mobile services switching centre 330 which is responsible for external connections of the mobile communications system, in this case for the connection to the public switched telephone network 336.

As is seen in FIG. 3, the group switching field 320 can establish connections both to the public switched telephone network (PSTN) 336 via the mobile services switching centre 328 and to a packet transmission network 342.

The connection between the packet transmission network 342 and the group switching field 320 is established by a support node 340 (SGSN =Serving GPRS Support Node). The function of the support node 340 is to transmit packets between the base station system and a gateway node (GGSN=Gateway GPRS Support Node) 344 and keep a record of the location of the subscriber terminal 302 in its area.

The gateway node 344 connects a public packet transmission network 346 and the packet transmission network 342. An Internet protocol or an X.25 protocol can be used at the interface. The gateway node 344 hides the internal structure of the packet transmission network 342 from the public packet transmission network 346 by encapsulating the structure, and thus the public packet transmission network 346 regards the packet transmission network 342 as a sub-network which comprises a subscriber terminal 302 to which the public packet transmission can send packets and receive packets from it.

The packet transmission network 342 is typically a private network which utilizes the Internet protocol and carries signalling and tunnelled user data. The structure of the network 342 may vary according to the operator in respect of its architecture and protocols below the Internet protocol layer.

The public packet transmission network 346 may be e.g. the world-wide Internet network.

Typically time slots not involved in circuit-switched transmission are used for packet transmission at the air interface 316. The capacity is reserved dynamically for packet transmission, i.e. as a data transmission request is received, any free channel can be allocated to packet transmission. The arrangement is flexible, which means that circuit-switched connections have priority over packet transmission connections. If necessary, circuit-switched transmission overrides packet-switched transmission, i.e. the time slot used by packet-switched transmission is allocated to circuit-switched transmission. This can be done because packet-switched transmission withstands such interruptions well: transmission is continued using another allocated time slot. The arrangement can also be implemented so that no absolute priority is given to circuit-switched transmission but both circuit-switched and packet-switched transmission requests are served in their order of arrival. These arrangements are not, however, relevant to the present invention.

Figure 4:
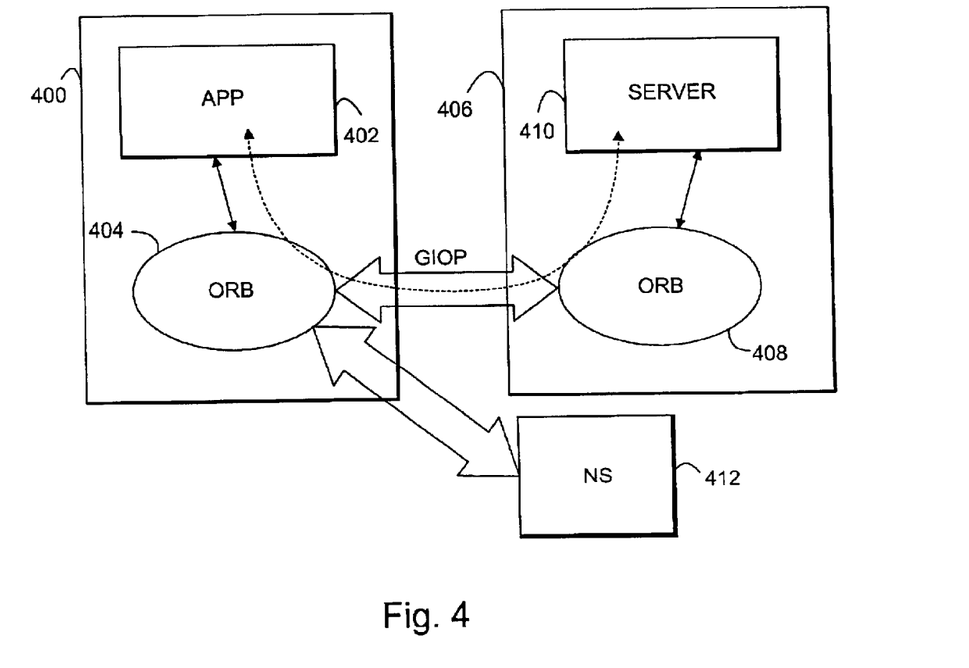
FIG. 4 illustrates CORBA architecture at a general level.

In the following, data transmission according to the CORBA architecture will be described at a general level by means of FIG. 4. FIG. 4 shows a wireless device 400 with an ongoing software application 402. The application needs a service, e.g. information from a database, and it sends a method call in which this service is defined. The device comprises another service broker application which is called an ORB (Object Request Broker) 404 and processes method calls from different applications. The ORB searches for the address of the service provider (suitable server) by sending a call to a CORBA name server 412. Having received a response, the ORB transmits the call to the server in question. In the case of FIG. 4 a suitable server is not found under the same ORB and thus the call is forwarded to a service broker application 408 of another device 406, which transmits the call to a suitable server 410 with which it communicates, the server being typically another software application. This server supplies a response which is transmitted to the original software application 402. The software application 402 does not know the actual location of the server, but receives information only on the surrounding environment through method calls. The service brokers and the sets of software can be implemented with different programming languages and in different apparatuses. During data transmission protection procedures related to the parties to data transmission are carried out in accordance with the CORBA architecture.

Figure 5:
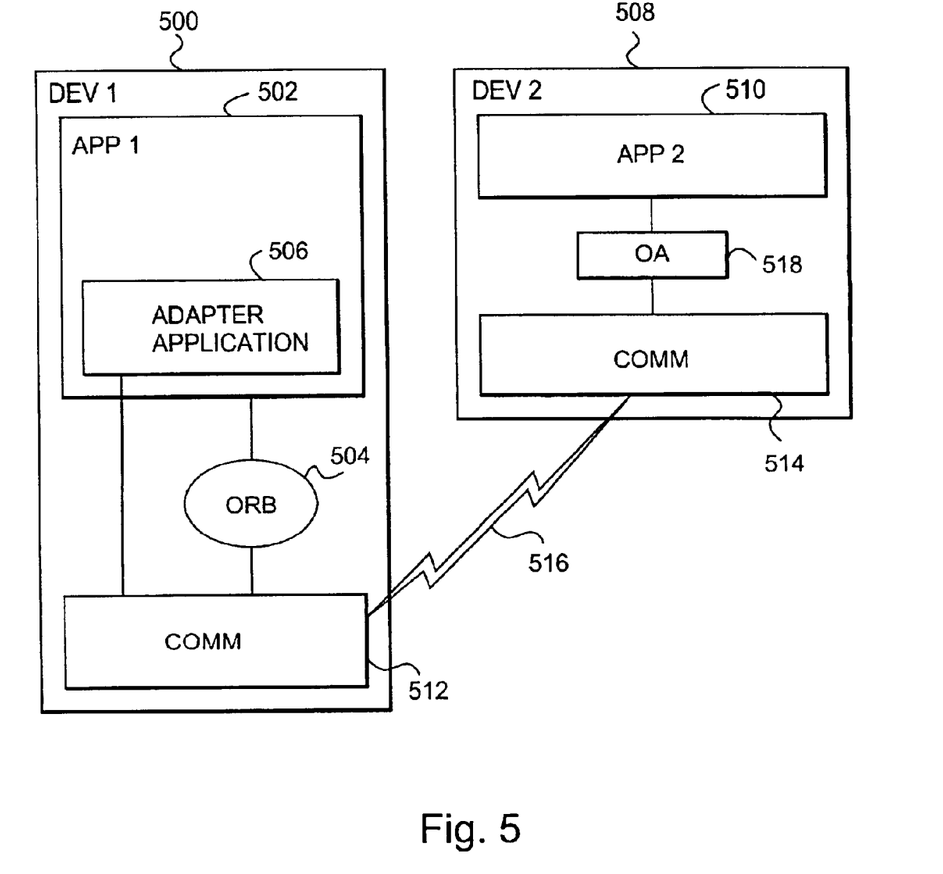
FIG. 5 illustrates a solution according to a preferred embodiment of the invention.

FIG. 5 illustrates a solution according to a preferred embodiment of the invention. The figure illustrates a device 500 which utilizes a wireless connection. An application 502 which is able to communicate is running in the device. The application is implemented by means of a script-based programming language, such as JavaScript or WMLScript. The application typically functions under browser software utilizing Internet connections. The device also typically comprises one or more service brokers 504 which supply a service request included in a method call to the indicated server, which is arranged to respond to the method call. The indicated server may be in another device. If the application needs a service, it sends a method call. The device comprises an adapter application 506 which recognizes method call parameters in a script-based method call. The application generates the method call in a format understood by the service broker and transmits it to the service broker 504. If necessary, the service broker forwards the call to software 508 to be run in another device 510. The software performs the desired service and returns a response via its own object adapter 518. The object adapter belongs to the CORBA architecture and adapts the method messages of the server for the service broker. Transmission takes place by means of communication devices 512 and 514 on a transmission path 516. The transmission path may be a radio path of a cellular radio system, another radio link such as Bluetooth, a link implemented by means of packet-switched traffic (GPRS) or an infrared link.

The application 506 is preferably implemented by a library application. The library application provides the necessary functions for a script-based application for sending method calls. The functions convert outgoing method calls into a general format understood by the service broker and in the other direction the messages entering the application are converted into script calls.

Figure 6:
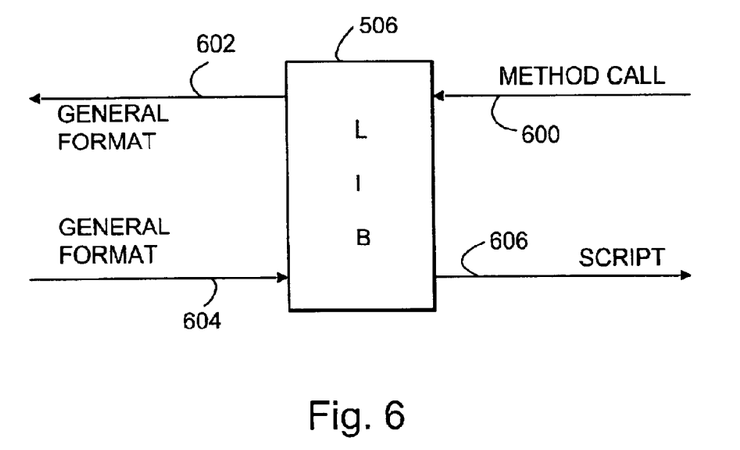
FIG. 6 illustrates the function of a solution according to a preferred embodiment of the invention.

The function of the application is shown in FIG. 6, which schematically illustrates a library application 506. A method call 600 sent by the script software is converted into a general message format 602 by a library function, whereas a message 604 entering the script software is converted into a script call 606 by the library function. This can be implemented e.g. by tabulating method calls and their parameters and response values. The library recognizes the correct message formats in the outgoing messages by means of the table. Incoming messages 604 typically include the name of the function, which makes conversion easy.

Figure 7:
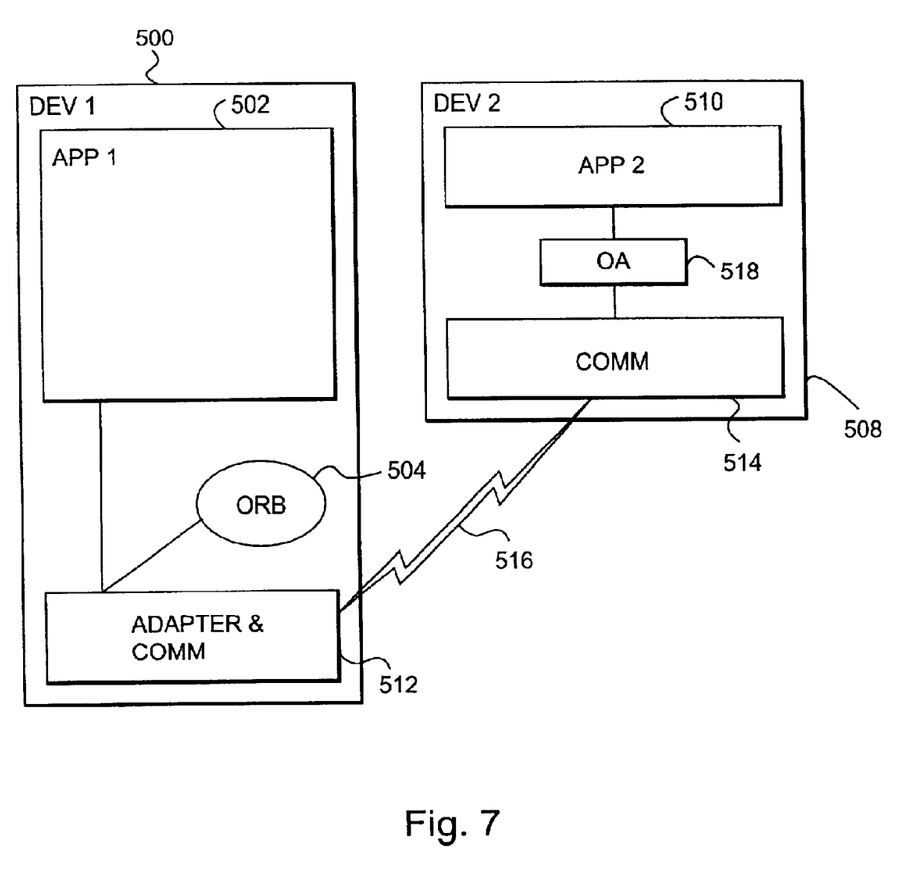
FIG. 7 illustrates a solution according to another preferred embodiment of the invention.

FIG. 7 illustrates another preferred embodiment of the invention. The figure is similar to FIG. 5, except that in this embodiment the adapter application is integrated into the communication devices, preferably forming part of the control software of the communication devices. This solution has the advantage that the complexity and memory need of the device decrease.

Figure 8:
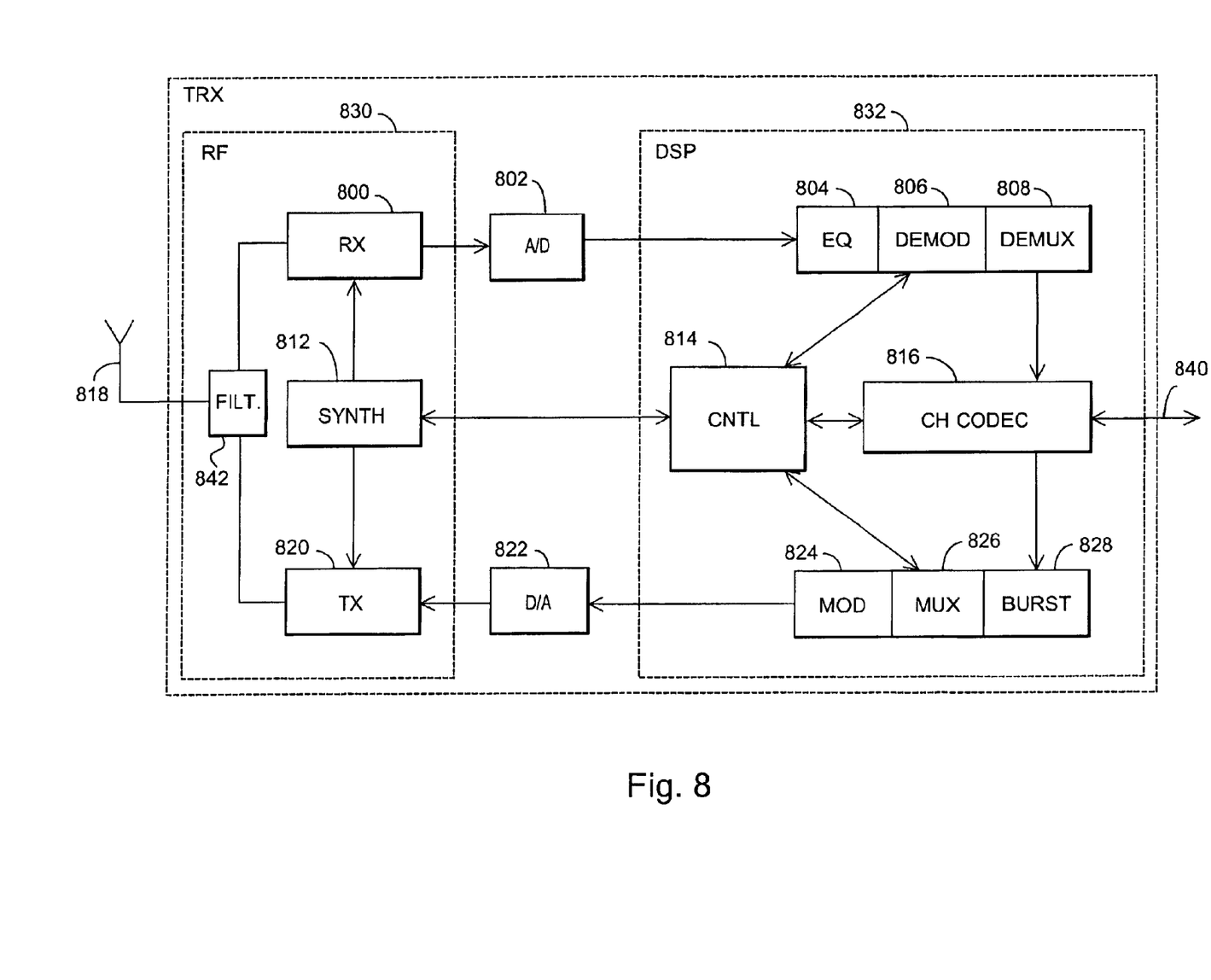
FIG. 8 illustrates the structure of a device suitable for use in an arrangement according to the invention.

FIG. 8 illustrates the structure of a wireless system in which the solution according to the preferred embodiments of the invention can be implemented. The device comprises an antenna 818 for transmitting and receiving signals. From the antenna a signal is supplied to a duplex filter which separates the signals of the transmission direction from the signals of the reception direction. The receiver 800 comprises a filter which prevents frequencies outside the desired frequency band. After this, the signal is converted into an intermediate frequency or directly into the baseband in which form a signal is sampled and quantized in an analogue/digital converter 802. An equalizer 804 compensates for interference, e.g. interference caused by multi-path propagation. A demodulator 806 picks up a bit flow from an equalized signal and transmits the flow to a demultiplexer 808. The demultiplexer 808 separates the bit flow from different time slots into separate logical channels. A channel codec 816 decodes the bit flow of different logical channels, i.e. decides whether the whole bit flow consists of signalling information which is transmitted to a control unit 814, or whether the bit flow consists of speech which is forwarded 840 e.g. to a speech decoder. The channel codec 816 also corrects errors. The control unit 814 performs internal control tasks by controlling different units. A burst generator 828 adds a training sequence and tail bits to the data received from the channel codec 816. A multiplexer 826 indicates a time slot for each burst. A modulator 824 modulates digital signals to a radio-frequency carrier wave. This function is analogue and thus a digital/analogue converter 822 is needed to perform it. A transmitter 820 comprises a filter for limiting the band width. The transmitter 820 also controls the output power of transmission. A synthesizer 812 provides different units with the necessary frequencies. The clock of the synthesizer 812 may be controlled locally. The synthesizer 812 generates the necessary frequencies e.g. by a voltage-controlled oscillator.

As illustrated in FIG. 8, the structure of a transceiver can be further divided into radio frequency parts 830 and a digital signal processing processor with software 832. The radio frequency parts 830 comprise the receiver 800, transmitter 820 and synthesizer 812. The digital signal processing processor and its software 832 include the equalizer 804, demodulator 806, demultiplexer 808, channel coded 816, control unit 814, burst generator 828, multiplexer 826 and modulator 824. The analogue/digital converter 802 is needed to convert an analogue radio signal into a digital radio signal and the digital/analogue converter 822 is needed to convert a digital signal into an analogue signal.

The device may also comprise user interface parts, such as a display, keyboard, earpiece and microphone. These are not shown in the figure. The control unit 814 of the device is typically implemented with a microprocessor and memory elements, including the necessary software. The control unit can be used for performing sets of software that need different services, as described above.

Even though the invention has been described with reference to the examples according to the accompanying drawings, it is clear that the invention is not limited thereto but may be modified in various ways within the inventive concept disclosed in the appended claims.

What is claimed is:

1. An arrangement for implementing data transmission between at least two sets of software which are used in one or more devices which comprise means for establishing a connection to a telecommunications system, in which arrangement at least a portion of a connection between two different devices is implemented with a wireless connection, and in which arrangement at least part of the communication between the devices is carried out by method calls, each of which includes a service request, and the system comprising one or more service brokers which supply the service request included in the method call to the server indicated, which is arranged to respond to the method call according to the service needed by sending information required by the service to the service broker, which is arranged to send the information to the sender of the method call, and a server that offers the service request being defined during the communication, and in which arrangement at least some of the programs used in the devices and participating in data transmission are implemented with a script-based programming language, where in the arrangement comprises an application which transmits service requests and responses to the requests between the service broker and the software that needs data transmission and renders data transmission requests and responses to the requests compatible between script-based software and another system.

2. An arrangement according to claim 1, where in the application is arranged to recognize method call parameters in a script-based method call and generate a method call in a format understood by the service broker.

3. An arrangement according to claim 2, where in the application is implemented in connection with data transmission means.

4. An arrangement according to claim 1, where in the application is implemented using a library application.

5. A method of implementing data transmission between at least two sets of software which are used in one or more devices which are able to establish a connection to a telecommunications system, the method comprising implementing at least a portion of a connection between two different devices with a wireless connection, carrying out at least part of the communication between the sets of software by means of method calls, each of which includes a service request, supplying said method call to a service broker of the system which supplies the service request included in the method call to the server indicated, which responds to the method call according to the service needed by sending the information required by the service to the service broker which sends the information to the sender of the method call, defining the server that offers the service request during the communication, implementing with a script-based programming language at least some of the programs used in the devices and participating in data transmission, sending the method calls to a certain application by the program used in the device employing wireless connections, the application transmitting service requests and responses to the requests between the service broker and the software that needs data transmission by the application and the application rendering data transmission requests and responses to the requests compatible between script-based software and another system.

6. A method according to claim 5, further comprising the step of the application recognizing method call parameters in a script-based method call and generating a method call in a format understood by the service broker.

7. A method according to claim 5, further comprising the step of the application recognizing a response message received from the service broker and converting the message into a format understood by the script-based application.

8. A method according to claim 6, further comprising the step of implementing the application by a library application which comprises functions.

* * * * *